United States Patent
Dodson

[11] 3,904,364
[45] Sept. 9, 1975

[54] METHODS OF AND APPARATUS FOR DETERMINING TRACE IMPURITIES

[75] Inventor: Edith Margaret Dodson, Malvern, England

[73] Assignee: National Research Development Corporation, London, England

[22] Filed: July 12, 1972

[21] Appl. No.: 271,210

[30] Foreign Application Priority Data
Feb. 18, 1972 United Kingdom............... 7512/72

[52] U.S. Cl......... 23/230 R; 23/230 M; 23/230 PC; 23/253 R; 23/253 PC; 73/15 B; 356/36; 356/209
[51] Int. Cl. ................. G01n 31/20; G01n 33/18; G01n 25/20
[58] Field of Search ........ 23/230 R, 230 PC, 253 R, 23/253 PC, 230 M; 356/36, 173, 209, 210, 356/212; 250/218; 73/15 B, 15

[56] References Cited
UNITED STATES PATENTS

| | | | |
|---|---|---|---|
| 2,688,532 | 9/1954 | Till.................................... | 23/230 M |
| 3,045,472 | 7/1962 | Paulik et al...................... | 23/230 R |
| 3,438,739 | 4/1969 | Powell............................... | 23/253 R |
| 3,607,071 | 9/1971 | Staffin et al. .................... | 23/253 PC |
| 3,614,230 | 10/1971 | Crawford.......................... | 356/210 |

OTHER PUBLICATIONS

Mettler, New Automatic Derivative Computor Aids Quantitative Thermogram Interpretation, Thermal Techniques Series, June 7, 1966. Mettler Instrument Corporation, 20 Nassau St., Princeton, N.J., Technical Bulletin, T-102.

Weisz, Herbert, Microanalysis by the Ring Oven Technique, Pergamon Press, New York, 1961, pp. 15–20 and 67–68.

Primary Examiner—Joseph Scovronek
Assistant Examiner—Dale Lovercheck
Attorney, Agent, or Firm—Cushman, Darby & Cushman

[57] ABSTRACT

The quantities of organic impurities in a non-organic liquid such as water is determined by preparing a hot layer of absorbent inorganic material containing a reagent, such as sulphuric acid, having the property such that it will convert organic impurities to free carbon on the layer. Liquid to be tested is dripped onto the hot layer where the impurities are converted to free carbon. Concentration of such carbon can be determined in a number of ways; by measurement of reflectivity of the layer; visual comparison with standard shaded layers; thermogravimetric analysis; or exposing the layer to an oxygen stream and measuring the carbon dioxide concentration in the stream.

13 Claims, 6 Drawing Figures

METHODS OF AND APPARATUS FOR DETERMINING TRACE IMPURITIES

The present invention relates to methods of determining trace impurities.

The production and assessment of very high purity water and chemical reagents is of great importance in the manufacture of integrated circuits, since trace impurities can significantly affect both device performance and production yield. Much attention has been paid to ionic impurities but little work has been done on the effect of water soluble organic materials and micro-colloids. Organic impurities in the water and reagents can create surface contamination which adversely affects the device processing. For instance, a thin organic film on the surface may affect the adhesion of subsequently deposited layers of metals or photoresist and may also pyrolyse during processing to give silicon carbide initiated defects.

Most methods of water purification, such as ion exchange, freezing and distillation, ignore the organic content of the product. Distillation can carry over organic impurities and ion exchange resins break down in use to give high concentrations, 100 ppm, of water soluble organic material. The use of activated charcoal to remove organic material is not completely satisfactory nor is the use of directional freezing.

Previous interest in the effects of trace organic material has been limited by the availability of assessment techniques of sufficient sensitivity and versatility. The permanganate method is highly unreliable in the presence of absorbed or atmospheric $CO_2$ and is very insensitive. Carbon analysers while much more sensitive, are again affected by extraneous $CO_2$ and seem to have minimum useful detectivity levels of 0.1 to 1.0 ppm carbon, due to high blank levels.

It is an object of the invention to provide a method of determining the presence and concentrations of trace impurities in non-organic liquids such as water, sulphuric acid, nitric acid and phosphoric acid, $H_3PO_4$.

According to the present invention there is provided a method of determining the quantities of organic impurities in a non-organic liquid including the steps of preparing a hot layer of absorbent inorganic material containing a reagent having the property that it will convert the organic impurities to free carbon on the layer, adding a controlled small quantity of the liquid to the layer and determining the carbon concentration in the layer.

The carbon concentration may be determined in a number of ways. For example by a. the measurement of reflectivity of part of the layer containing deposited carbon and part of the layer free from deposited carbon;

b. visual comparison of the shade of the layer with a set of standard shaded layers;

c. thermogravimetric analysis whereby the layer is continuously weighed while it is being heated in an oxidising atmosphere and as the carbon is converted to carbon dioxide the loss in weight is recorded;

d. exposing the layer to an oxygen stream and determining the carbon dioxide concentration in the stream.

The carbon dioxide concentration in the oxygen stream may be determined either by infra red spectroscopy or for large amounts by passing it into potassium hydroxide and determining the quantity of carbon dioxide absorbed by the increase in weight or by converting the carbon dioxide to methane and determining the concentration of methane.

The reagent on the layer may be concentrated sulphuric acid.

According to an aspect of the invention there is provided a reflectometer including means for illuminating parts of an object and means for measuring the amounts of radiation reflected from those parts.

One embodiment of the invention, given by way of example only, will now be described with reference to the accompanying drawings, in which.

The method of determining quantities of organic impurities in a non-organic liquid is based upon the charring of the organic material in contact with boiling concentrated sulphuric acid to free carbon. Under controlled conditions, this carbon product is very stable. A modification to the Weisz ring oven technique on non-organic layers enables very low carbon contents to be concentrated in an annular ring. This intensifies the colour of the ring and provides a high in-built concentration factor. Hence very low trace levels of organic impurities can be assessed as well as those at higher levels.

Figure 1:
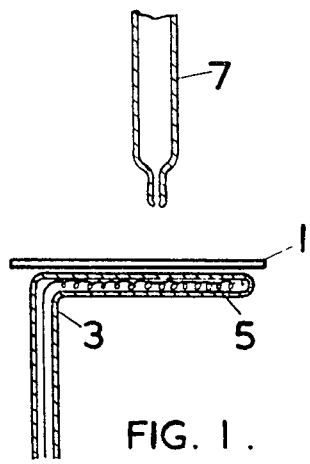
FIG. 1 is a view in elevation of apparatus for collecting small quantities of liquid and converting organic content to carbon.

FIG. 1 is a view in elevation of apparatus for collecting small quantities of liquid and converting organic content to carbon.

A non-organic layer 1 is cut from 0.01 inch (250 $\mu$m) or 0.0025 inch (60 $\mu$m) thick alumina which is made highly absorbent by being sintered to the consistency of unglazed porous pot. After baking out for several hours at approximately 450°C to remove any organic contamination, the layer 1 is kept in a dust-free atmosphere. For an impurity determination, the layer is heated on a tiny ring furnace having a diameter of about 10 mm, which consists of a platinum spiral 5 inside a thin silica tube. This produces on the layer 1 a hot ring with a cooler centre. One drop of concentrated sulphuric acid is placed at the centre of the layer 1 and diffuses sideways until, in contact with the hot ring, it reaches approximately 300°C and starts to "smoke," i.e., to give off $SO_3$. At this stage a measured volume of the non-organic liquid under test is dropped from a micropipette 7 on the centre of the layer 1. The micropipette 7 is used to give very small drops. Sideways diffusion up the temperature gradient occurs, and the liquid evaporates in contact with the hot ring. The hot sulphuric acid immediately converts the organic content to free carbon, i.e., a dark ring of carbon appears.

Figure 2:
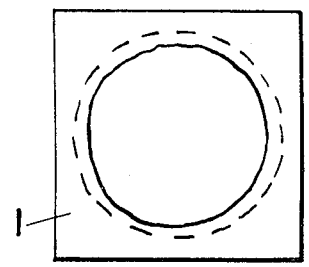
FIG. 2 is a view in plan of a layer on which organic materials have been converted to carbon.

FIG. 2 is a view in plan of a layer on which organic materials have been converted to carbon.

One microgram total carbon gives a very definite ring and the lower detection limit is about $10^{-9}$ gm. However, much lower levels can be measured, since the method has a large in-built concentration factor. For very low levels one merely continues to drop a measured volume of the sample under test on the hot substrate where the liquid evaporates and the organic ring builds up to a level at which it is easily visible. Using microdrops the concentration factor can therefore be as much as X 1,000, i.e., one can go down to a very low limit. For more concentrated solutions, e.g., above 20 $\mu$gms total carbon, the ring stain is too dark. Dilution with organic free water can reduce this to a suitable level.

Standards are prepared from the organic free water and known weights of a standard organic material in the range 0 to 20 $\mu$gms total carbon (several in the 1 in $10^9$ to 1 in $10^4$ range). For the majority of purposes direct visual comparison with these standard is adequate.

Figure 3:
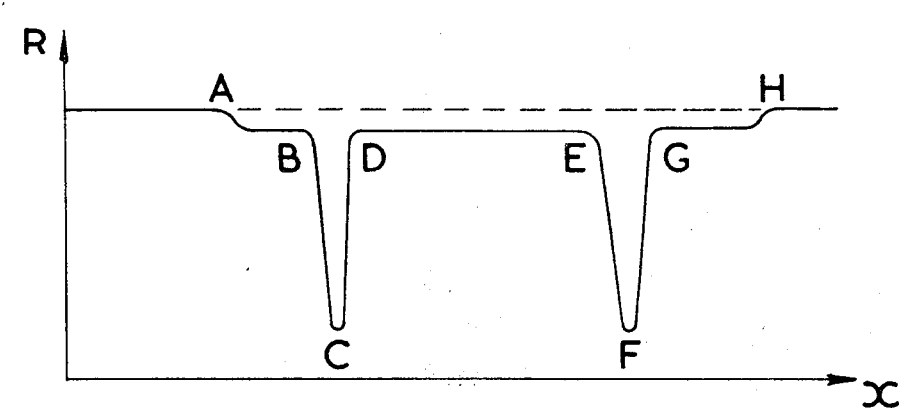
FIG. 3 is a graph of reflectance plotted across a diameter of a typical layer.
Figure 4:
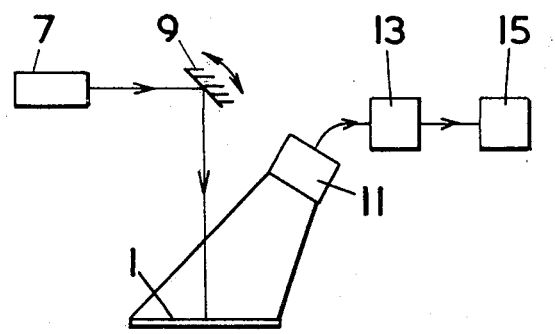
FIG. 4 is a schematic diagram of a micro-reflectometer.

For accurate quantitative measurements, however, a reflectometer may be used on the layer. FIG. 3 is a graph of reflectance R plotted against distance $x$ across a diameter of the layer and FIG. 4 is a schematic diagram of a micro-reflectometer.

Untreated parts of the layer 1 will have a relatively high reflectance and so R will have a high value for $x = 0$. This high value will be maintained for increasing values of $x$ up to a point A on the graph which corresponds to the edge of the sulphuric acid. The sulphuric acid leaves a faint grey stain (known as the sulphuric acid shadow) and so at the point A the value of reflectance R will fall slightly. However the value of reflectance R will be maintained fairly steady until the beginning B of the carbon ring stain where the reflectance R will fall to a minimum C and rise again to a point D having roughly the same reflectance value as the point B, namely the sulphuric acid shadow level. Again this level of reflectance is maintained until the diametrically opposite part of the carbon ring stain is reached. Here the graph describes an approximately triangular shape EFG which is roughly a mirror image of the shape BCD. Finally at a point H which corresponds to the far edge of the sulphuric acid shadow stain the reflectance R returns to its original high value.

The amount of carbon deposited on the layer 1 from the water is proportional to the area of the triangle BCD (which will be equal to the area of the triangle EFG). A micro-relectometer can be used for measuring this area. A suitable micro-reflectometer is illustrated in FIG. 4.

A small spot of light is shone on the layer 1 from a source 7 via a mirror 9. The mirror 9 can be tilted in such a way that the spot of light scans a diameter of the disc 1. Light reflected from the disc 1 is collected by a detector 11 whose output is integrated in an integrator 13. The output of the integrator 13 is indicated on a meter 15.

The action of the device is as follows. Light is shone on the layer 1 from the source 7 and scanned across the diameter of the layer 1 by means of the mirror 9. The combination of the detector 11, the integrator 13 and the meter 15 will give a reading proportional to the area under a graph like the graph in FIG. 3. Two readings are taken, one on a slice which has been used for an impurity determination of this sort, and one on a slice which contains the sulphuric acid stain only. The difference between the two readings will be proportional to the amount of carbon deposited on the layer from impurities in the water.

Figure 5:
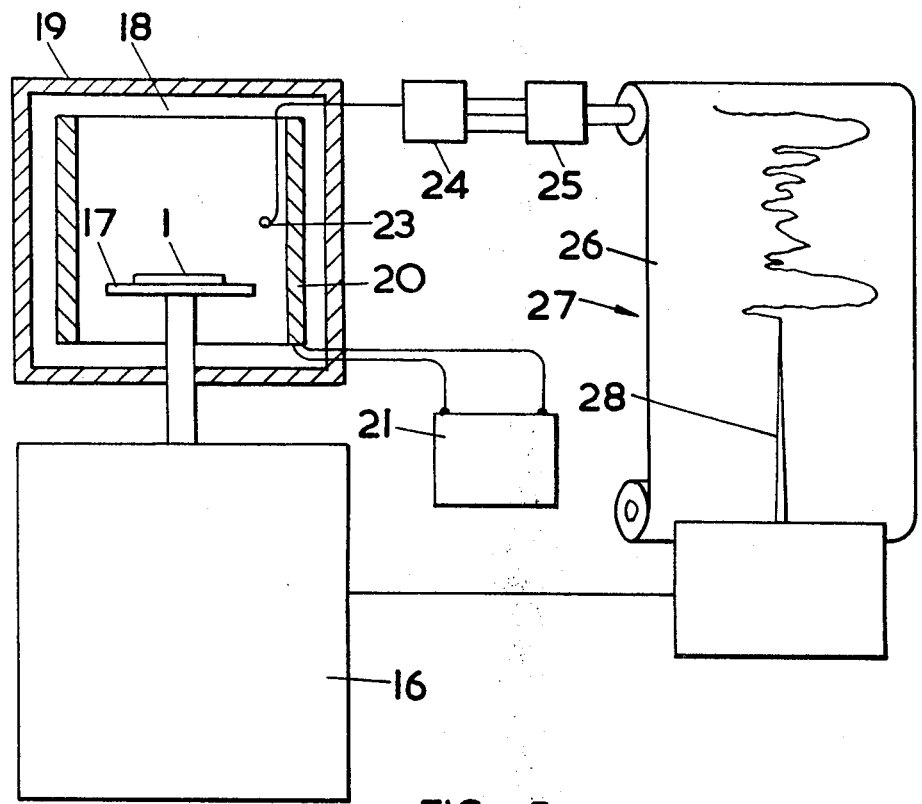
FIG. 5 is a diagram of apparatus for determining the concentration of a porous inorganic layer by differential thermal analysis.

FIG. 5 is a diagram of apparatus for determining the carbon content of a porous inorganic layer by thermogravimetric analysis. An automatic balance 16 has a pan 17 on which is placed a specimen which in the case of the present invention will be the layer 1. The pan 17 is held in an oxidising atmosphere 18 in a furnace 19. Heat is supplied to the layer 1 in the furnace 19 by a cylindrical electric heating element 20 energised from a source 21. The temperature of the layer 1 is measured by a temperature sensor 23 such as a thermocouple. The output of the sensor 23 is applied to a servomechanism 24 which controls a motor 25 which is used to drive the chart 26 of a pen recorder 27. The pen 28 of the pen recorder 27 is controlled by the output of the balance 16 to indicate the rate of loss of mass of the layer 1.

The action of the apparatus is as follows. As the layer 1 is heated by the heating element 20 its temperature is plotted against its rate of loss of mass on the chart 26. The action of the heat in the oxidising atmosphere 18 on the layer 1 is to convert the carbon in the layer 1 to carbon dioxide at a definite known temperature. At this temperature the pen 28 will draw a spur on the chart 26 indicating a loss of mass due to the carbon dioxide given off. The area under this spur is proportional to the amount of carbon dioxide given off and hence to the total mass of carbon originally on the layer 1.

Figure 6:
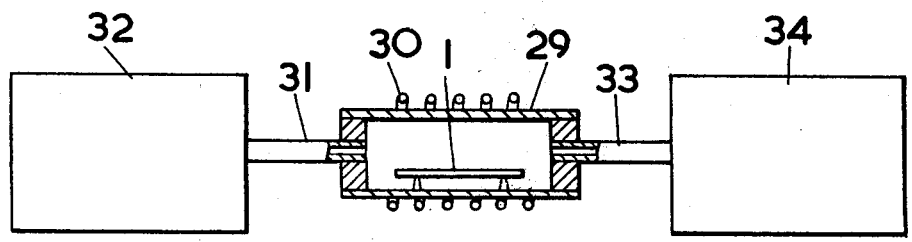
FIG. 6 is a cross sectional diagram of alternative apparatus for determining the carbon content of a porous inorganic layer.

FIG. 6 is a cross-sectional diagram of alternative apparatus for determining the carbon content of inorganic layers. The layer 1 is placed in a furnace such as a silica tube 29 surrounded by a heater 30. An inlet tube 31 is connected to a carbon dioxide free oxygen supply 32 and an outlet tube 33 is connected to a detector 34.

The action of the apparatus is as follows. The layer 1 is heated by the heater 30 in the oxygen stream entering via the tube 31 to form carbon dioxide and the carbon dioxide concentration in the outlet tube 33 is detected by the detector 34.

The detector 34 can take various forms. It can be a detector of known type working by infra-red spectroscopy in which the concentration of carbon dioxide is determined by its infra-red spectrum. Alternatively it can include potassium hydroxide which absorbs all the carbon dioxide so that the total quantity of carbon dioxide is determined by observing the increase in mass in the potassium hydroxide. Alternatively the carbon dioxide can be converted to methane, the concentration of which in a gas stream can be very precisely determined in a known manner by continuous measurement of its thermal conductivity as in gas chromatography.

What I claim is:

1. A method of determining the quantity of organic carbon impurities in a non-organic liquid comprising the steps of heating a layer of sintered, porous absorbent inorganic material to provide a ring on the layer of higher temperature than the remainder of the layer, adding to the center of the layer, from which location it diffuses outwards, a controlled amount of reagent having the property that it will convert the organic impurities to free carbon on the layer adding a controlled small quantity of the non-organic liquid to be tested onto the center of the layer, converting the organic impurity to free carbon on the layer, and thereafter determining the carbon concentration in the layer.

2. The method claimed in claim 1 in which the carbon concentration in the layer is determined by the measurement of reflectivity of part of the layer containing deposited carbon and part of the layer free from deposited carbon.

3. The method claimed in claim 1 in which the carbon concentration in the layer is determined by thermogravimetric analysis whereby the layer is continuously weighed whilst it is being heated in an oxidising atmosphere and as the carbon is converted to carbon dioxide the loss in weight is recorded.

4. The method claimed in claim 1 in which the carbon concentration in the layer is determined by exposing the layer to an oxygen stream and determining the carbon dioxide concentration in the stream.

5. Apparatus for determining the quantity of organic-carbon in impurities in a non-organic liquid comprising an absorbent, sintered, porous inorganic layer, a ring-shaped heating element proximate the layer, means for dropping small controlled amounts of reagent onto the layer, means for dropping small controlled amounts of the liquid sample onto the layer, and means for determining the carbon concentration in the layer.

6. Apparatus as claimed in claim 5 wherein the layer is alumina which has been sintered to the consistency of unglased porous pot.

7. Apparatus as claimed in claim 5 wherein the means for determining the carbon concentration includes a microreflectometer, a detector, an integrator, and a meter.

8. Apparatus as claimed in claim 5 wherein the means for determining the carbon concentration includes a furnace for containing the layer and an oxidising atmosphere, an automatic balance with a weighting pan for operating within the furnace, a pen recorder whose chart movement is controlled in response to a temperature sensor arranged in the furnace and whose pen movement is controlled by the output of the automatic balance.

9. Apparatus as claimed in claim 5 wherein the means for determining the carbon concentration includes a source of oxygen supply, a furnace, and a detector arranged so that the furnace may heat the layer as oxygen is passed through the furnace to form carbon dioxide for measurement by the detector.

10. The method claimed in claim 1 in which the reagent is concentrated sulfuric acid.

11. The method claimed in claim 1 in which the heating is accomplished with a ring heater.

12. The method claimed in claim 1 in which the non-organic liquid to be tested is water.

13. A method of determining the quantity of organic carbon impurities in water comprising the steps of (a) heating a layer of porous, absorbent, sintered inorganic material providing on the layer a ring of higher temperature than the remainder of the layer, (b) adding to the center of the layer, from which it diffuses outwards, a controlled amount of concentrated sulfuric acid, (c) adding a controlled small quantity of the water to be tested onto the center of the water layer, thereby converting the organic impurity to free carbon on the layer, and thereafter (d) determining the carbon concentration in the layer.

* * * * *